(12) United States Patent
Song et al.

(10) Patent No.: US 11,089,381 B2
(45) Date of Patent: Aug. 10, 2021

(54) APPARATUS AND METHOD FOR SIMULTANEOUS PLAYBACK AND BACKUP OF MEDIA IN A WEB BROWSER

(71) Applicant: HANWHA TECHWIN CO., LTD., Seongnam-si (KR)

(72) Inventors: Chang Hee Song, Changwon-si (KR); Sweung Won Cheung, Changwon-si (KR); Jong Chan Park, Changwon-si (KR); Mi Ju Park, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 19 days.

(21) Appl. No.: 15/856,409

(22) Filed: Dec. 28, 2017

(65) Prior Publication Data

US 2018/0213295 A1    Jul. 26, 2018

Related U.S. Application Data

(60) Provisional application No. 62/457,203, filed on Feb. 10, 2017.

(30) Foreign Application Priority Data

Jan. 20, 2017    (KR) .................. 10-2017-0009963
Jul. 11, 2017    (KR) .................. 10-2017-0087672

(51) Int. Cl.
*H04N 21/61*    (2011.01)
*H04N 21/231*    (2011.01)
(Continued)

(52) U.S. Cl.
CPC ..... *H04N 21/6125* (2013.01); *H04L 65/4069* (2013.01); *H04L 65/601* (2013.01);
(Continued)

(58) Field of Classification Search
CPC ........ H04N 21/6125; H04N 21/23116; H04N 21/2743; H04N 21/85406; H04L 65/4069; H04L 65/601; H04L 65/602
(Continued)

(56) References Cited

U.S. PATENT DOCUMENTS

2007/0183741 A1 * 8/2007 Lerman ................ G11B 27/034
386/249
2009/0276771 A1 * 11/2009 Nickolov .............. G06F 9/4856
717/177
(Continued)

FOREIGN PATENT DOCUMENTS

CN    105630507 A    6/2016
JP    2005527881 A    9/2005
(Continued)

OTHER PUBLICATIONS

Communication dated Jun. 5, 2018, issued by Korean Intellectual Property Office in counterpart Korean Application No. 10-2017-0087672.
(Continued)

*Primary Examiner* — Alfonso Castro
(74) *Attorney, Agent, or Firm* — Sughrue Mion, PLLC

(57) ABSTRACT

The present disclosure relates to an apparatus and method for simultaneously playing back and storing media without a plug-in in a web browser. In the present disclosure, since restoration of video, restoration of audio, and backup of media are performed in a multi-threaded manner using a
(Continued)

web worker, it is possible to simultaneously perform playback and storage of media. To this end, interworking is performed between a video web worker performing restoration of video, an audio web worker performing restoration of audio, and a backup web worker performing backup of media. According to the present disclosure, it is possible to simultaneously perform playback and backup of media, and it is also possible to stop backup of media and then resume the backup.

20 Claims, 10 Drawing Sheets

(51) Int. Cl.
  *H04L 29/06* (2006.01)
  *H04N 21/854* (2011.01)
  *H04N 21/2743* (2011.01)
(52) U.S. Cl.
  CPC ..... *H04L 65/602* (2013.01); *H04N 21/23116* (2013.01); *H04N 21/2743* (2013.01); *H04N 21/85406* (2013.01)
(58) Field of Classification Search
  USPC .......................................................... 725/86
  See application file for complete search history.

(56) References Cited

U.S. PATENT DOCUMENTS

| | | | | |
|---|---|---|---|---|
| 2011/0021136 | A1* | 1/2011 | Patsiokas | H04H 40/90 |
| | | | | 455/3.06 |
| 2014/0047413 | A1* | 2/2014 | Sheive | H04L 65/403 |
| | | | | 717/110 |
| 2014/0298369 | A1* | 10/2014 | Gagnon | H04N 21/4122 |
| | | | | 725/25 |
| 2015/0062353 | A1* | 3/2015 | Dalal | G11B 27/3036 |
| | | | | 348/194 |
| 2015/0222693 | A1* | 8/2015 | Tully | G06F 16/957 |
| | | | | 709/203 |
| 2017/0223432 | A1* | 8/2017 | Lee | H04N 7/015 |
| 2017/0289616 | A1* | 10/2017 | Igarashi | H04N 21/431 |
| 2018/0035153 | A1* | 2/2018 | Yang | H04N 21/478 |
| 2018/0332316 | A1* | 11/2018 | Wang | H04N 21/231 |

FOREIGN PATENT DOCUMENTS

| | | |
|---|---|---|
| KR | 1020020071346 A | 9/2002 |
| KR | 1020050023090 A | 3/2005 |
| KR | 1020140063950 A | 5/2014 |
| WO | 2016060410 A1 | 4/2016 |

OTHER PUBLICATIONS

Communication dated May 6, 2020 from the State Intellectual Property Office of the P.R.C. in application No. 201810048973.0.

* cited by examiner

REPLACEMENT SHEET
FIG. 14
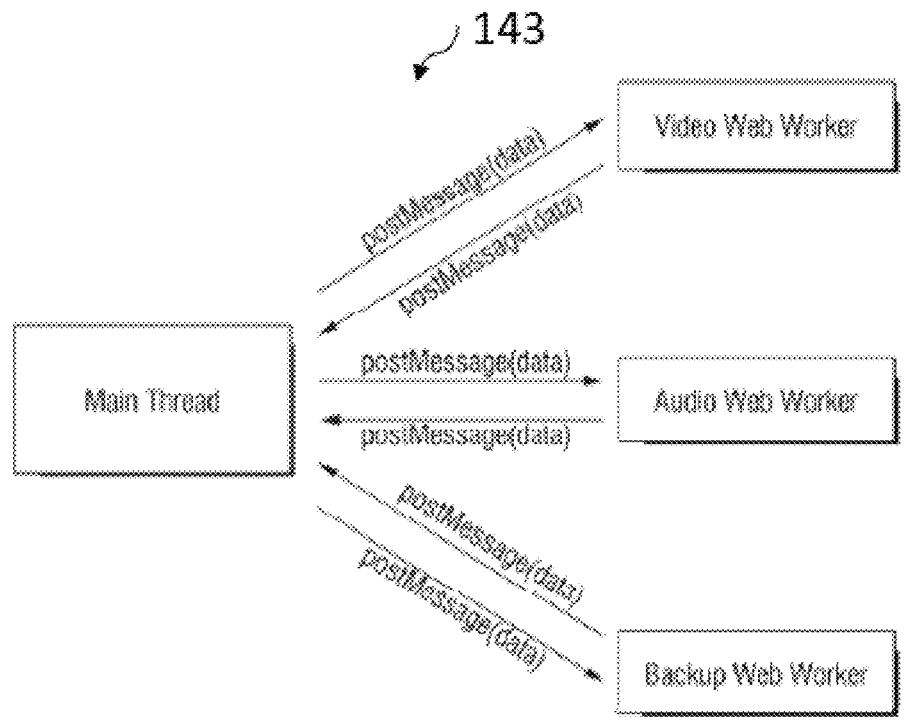

APPARATUS AND METHOD FOR SIMULTANEOUS PLAYBACK AND BACKUP OF MEDIA IN A WEB BROWSER

CROSS-REFERENCE TO THE RELATED APPLICATIONS

This application claims priority from Korean Patent Application No. 10-2017-0009963, filed on Jan. 20, 2017 in the Korean Intellectual Property Office; U.S. Provisional Application No. 62/457,203, filed on Feb. 10, 2017 in the U.S. Patent and Trademark Office; and Korean Patent Application No. 10-2017-0087672, filed on Jul. 11, 2017 in the Korean Intellectual Property Office, the disclosures of which are incorporated herein in their entireties by reference.

BACKGROUND

1. Technical Field

The present disclosure relates to an apparatus and method for simultaneous playback and backup of media, and more particularly, to an apparatus and method for simultaneously performing playback and backup of media without mutual influence in a multi-threaded manner in a web browser.

2. Description of the Related Art

In order for a user to play back media data on a web browser through the Internet, a plug-in, in which a codec, a decoder, a renderer and the like are written in native code, may be used. Examples of web browser plug-ins include ActiveX and Netscape Plugin Application Programming Interface (NPAPI).

ActiveX was developed by Microsoft Corporation using a combination of two technologies: Component Object Model (COM) and Object Linking and Embedding (OLE). However, in a narrow sense, it refers to an ActiveX control used in the form of an add-on in Microsoft's Internet Explorer web browser. ActiveX enables the Internet Explorer web browser to play media.

NPAPI is an application programming interface (API) developed for Netscape browsers, and is similar in functionality to ActiveX of Internet Explorer. NPAPI is an API provided for using an external application program in a plug-in format in order to enhance the function of a web browser, and was used primarily for the web environment in its embryonic stage. In other words, it was developed to play music and videos on early web pages. For example, Java Applet, Adobe Flash, Real Player and the like take advantage of the NPAPI technology.

However, since a plug-in is sometimes abused by hackers to distribute malicious code, many mainstream web browsers no longer support plug-ins. In the case of NPAPI, Google, which produces and distributes Chrome web browser, no longer supports NPAPI after the release of Chrome version 45. In addition, ActiveX is no longer supported by Microsoft Edge browser, which is the default browser for Windows 10 operating system.

As a method for playing back media on a web browser without a plug-in, a decoder or the like may be implemented in JavaScript. When a decoder is implemented in JavaScript, there is an advantage in that decoding can be performed without limitation on the codec format. However, since JavaScript supports only a single thread, if it is intended to simultaneously perform playback and storage of media, they may affect each other.

A web worker of HyperText Markup Language version 5 (HTML5) refers to JavaScript running in the background independently of a user interface script. Conventionally, a web page does not respond until a task is completed due to the single threaded nature of JavaScript, but multi-thread can be implemented by a web worker.

Accordingly, the present disclosure proposes an apparatus and method capable of simultaneously playing and storing media using a web worker.

SUMMARY

Aspects of the present disclosure provide an apparatus and method for simultaneously playing back and storing media without a plug-in in a web browser.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of an example embodiment, there is provided a media playback apparatus for playing back and backing up media on a web browser. The media playback apparatus may include: a receiver configured to receive media data generated in a media service apparatus using a communication protocol which supports web services and separate compressed video data and compressed audio data from the media data; a web worker generator configured to generate a plurality of web workers including a video web worker, an audio web worker and a backup web worker; a video decoder implemented as a first script supported by the web browser, and configured to decode the compressed video data using the video web worker as a first thread to restore video; an audio decoder implemented as a second script supported by the web browser, and configured to decode the audio data using the audio web worker as a second thread to restore audio; and a backup configured to receive video frames included in the compressed video data from the video web worker, receive audio frames included in the compressed audio data from the audio web worker, multiplex the received video data and audio data using the backup web worker as a third thread, and store the multiplexed video and audio data in a storage.

According to an aspect of an example embodiment, there is provided a media service apparatus for transmitting media data to a media playback apparatus. The media service apparatus may include: a module storage configured to store a script module necessary to play back the media data on a web browser of the media playback apparatus; a module transmitter configured to transmit the script module to the media playback apparatus in response to connection of the media playback apparatus; a packetizer configured to packetize the media data to generate a communication packet; and a web server configured to establish a communication session with the media playback apparatus and transmit the communication packet to the media playback apparatus in response to a request from the media playback apparatus. The script module may be configured to: receive the communication packet through the communication session, separate compressed video data and compressed audio data from the media data, generate a video web worker, an audio web worker and a backup web worker, receive video frames included in the compressed video data from the video web worker, receive audio frames included in the compressed audio data from the audio web worker and multiplex the received video data and audio data using the backup web worker as a thread.

Example embodiments of the present disclosure provide at least the following effects.

In the present disclosure, since a plug-in is not used, it is strong against security threats and conforms to the trend that plug-ins are being deprecated in web browsers.

According to the present disclosure, since media can be played back and stored at the same time in a web browser, live media being captured at a remote place can be stored in real time.

The effects of the present disclosure are not limited to the above-described effects and other effects which are not described herein will become apparent to those skilled in the art from the following description.

BRIEF DESCRIPTION OF THE DRAWINGS

The above and/or other aspects and features of the present disclosure will become more apparent by describing in detail example embodiments thereof with reference to the attached drawings, in which:

FIG. 14 shows a main thread, a video web worker, an audio web worker and a backup web worker generated by a web worker generating unit;

DETAILED DESCRIPTION

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the example embodiments set forth herein. Rather, these example embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated components, but do not preclude the presence or addition of one or more other components.

Hereinafter, example embodiments of the present disclosure will be described in detail with reference to the accompanying drawings.

Figure 1:
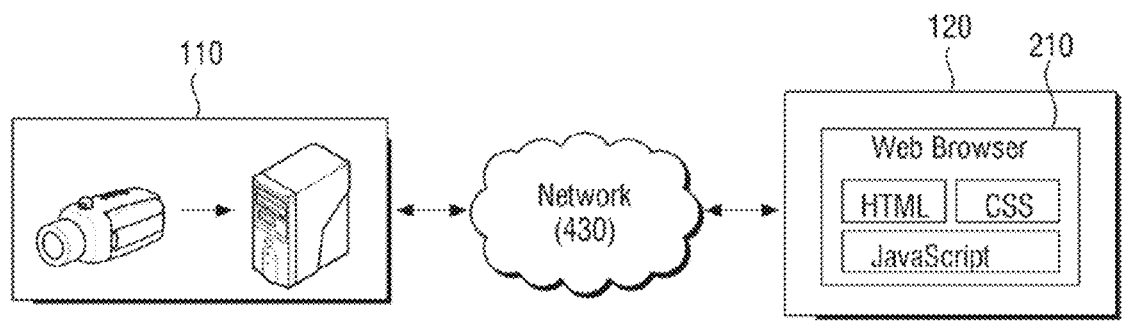
FIG. 1 shows an example embodiment of the entire system for media playback.

FIG. 1 illustrates one example embodiment of the entire system for playing back and seeking media. The entire system of FIG. 1 includes a media service apparatus 110, a media playback apparatus 120, and a network 430 connecting the two apparatuses.

The media service apparatus 110 includes a computing or processing device suitable for providing computing services to one or more video playback apparatuses. For example, the media service apparatus 110 includes a device, such as a network camera, a network video recorder (NVR) and a digital video recorder (DVR), capable of generating or storing a video stream and transmitting the video stream to user devices.

The media playback apparatus 120 includes a computing or processing device suitable for interacting with the media service apparatus 110 or other computing user devices via the network 430. For example, the media playback apparatus 120 may include a desktop computer, a mobile phone or smart phone, a personal digital assistant (PDA), a laptop computer and a tablet computer.

The media captured or stored in real time by the media service apparatus 110 is transmitted through the network 430 at the request of the media playback apparatus 120. The user can play back or seek the media transmitted through a user interface implemented on a web browser 210 of the media playback apparatus 120. In this case, the web browser 210 includes not only a commonly known browser such as Google Chrome, Microsoft Explorer, Mozilla Firefox and Apple Safari installed on a desktop computer or mobile phone, but also software applications that are created separately using APIs or resources of the web browser.

Hereinafter, Real Time Streaming Protocol/Real-time Transport Protocol (RTSP/RTP) data transmitted over a WebSocket, which is a network communication scheme between the media service apparatus 110 and the media playback apparatus 120, will be described with reference to FIG. 2 to FIG. 5.

Figure 2:
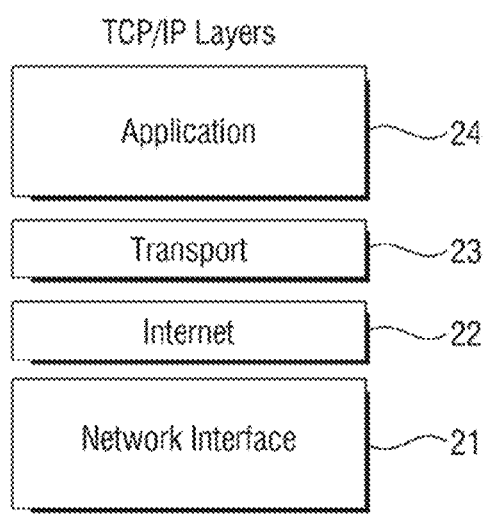
FIG. 2 is a diagram illustrating a Transmission Control Protocol/Internet Protocol (TCP/IP) 4-layer model that is hierarchically defined for communication between devices.

FIG. 2 is a diagram illustrating a Transmission Control Protocol/Internet Protocol (TCP/IP) 4-layer model that is hierarchically defined for communication between devices. The four layers include a network interface layer 21, an Internet layer 22, a transport layer 23 and an application layer 24. Since the WebSocket connection in the RTSP/RTP protocol transmitted over the WebSocket is located at the top of the connection of the transport layer 23, in order to use the WebSocket connection, a TCP transport connection must first be established between the media service apparatus 110 and the media playback apparatus 120. Once the WebSocket connection is established between the media service apparatus 110 and the media playback apparatus 120, for example, via a 3-way handshake process, the WebSocket communication is performed by transmitting WebSocket packets. The WebSocket connection and the WebSocket packet will be described in detail with reference to FIGS. 3 to 5 below.

Figure 3:
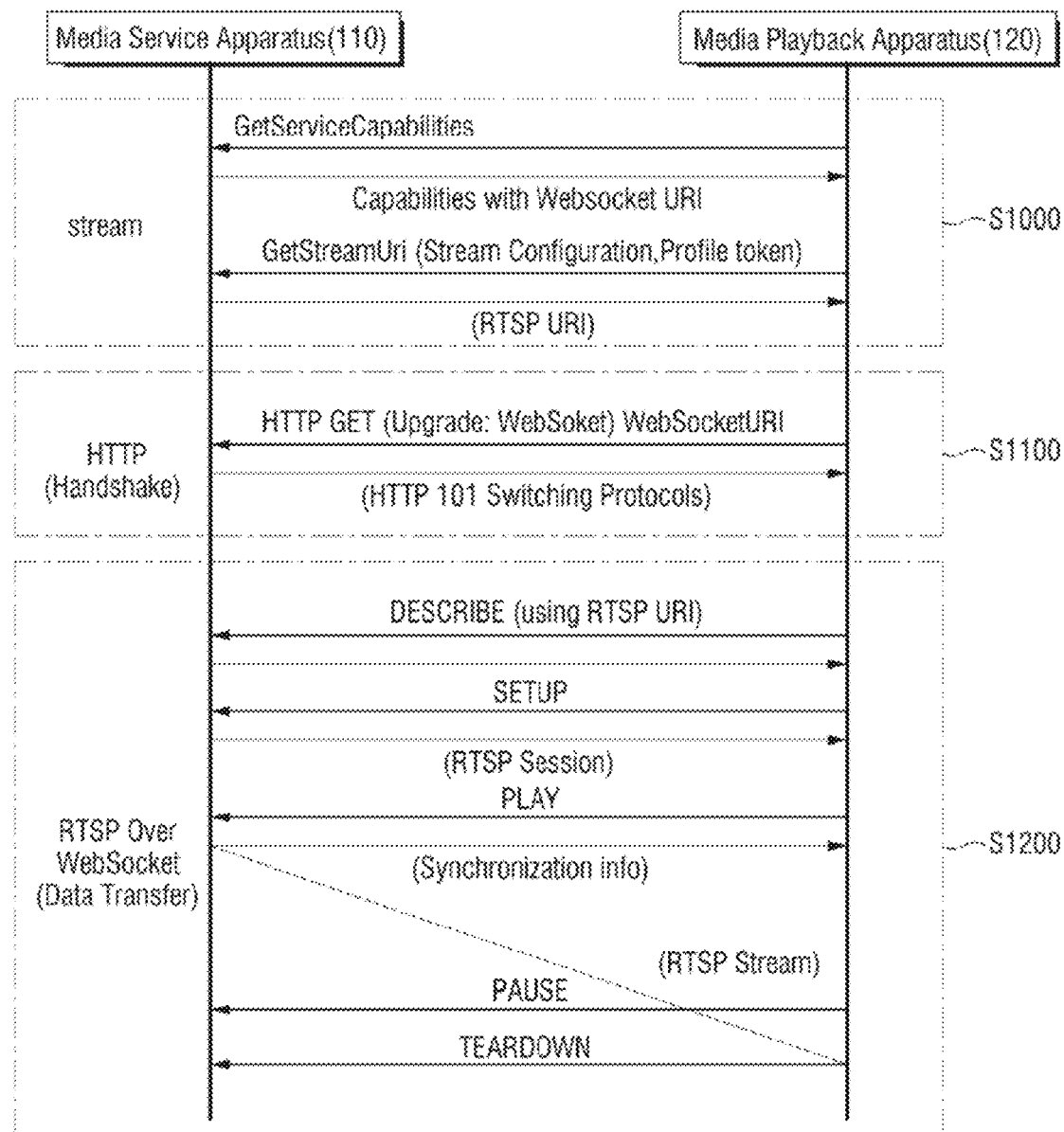
FIG. 3 shows a process of performing a WebSocket connection between a media service apparatus and a media playback apparatus.

FIG. 3 shows a process of performing a WebSocket connection between the media service apparatus 110 and the media playback apparatus 120. The media playback apparatus 120 requests the media service apparatus 110 to initiate a WebSocket connection using a WebSocket URI. The WebSocket URI can be obtained using a command of GetServiceCapabilities. The WebSocket URI is expressed, for example, as "ws://192.168.0.5/webSocketServer" (S1000).

The media playback apparatus 120 sends a WebSocket upgrade request to the media service apparatus 110. The media service apparatus 120 responds with code 101, which is a status code to approve a protocol change request (S1100).

After the WebSocket connection is established between the media service apparatus 110 and the media playback apparatus 120, data is exchanged through the RTSP/RTP protocol transmitted over WebSocket instead of Hypertext Transfer Protocol version 1.1 (HTTP/1.1). DESCRIBE, SETUP, PLAY, PAUSE and TEARDOWN in FIG. 3 are RTSP commands. A DESCRIBE request includes a URL. A response message to DESCRIBE also includes a description of the request. A SETUP request specifies whether a single media stream should be transmitted. A PLAY request is a request to play one or all media streams, and multiple requests are possible. A PAUSE request is a command to pause the playback of one or all media streams. The playback can be restarted with a PLAY request. A TEARDOWN request is a command to terminate a session. The playback of all the media streams is stopped by the TEARDOWN request and all sessions related to the data are also released (S1200).

An example of a request message sent from the media playback apparatus 120 and a response message of the media service apparatus 110 in the WebSocket connection process shown in FIG. 3 is as shown in Table 1 below.

TABLE 1

Media Playback Apparatus 120 -> Media Service Apparatus 110

GET /webSocketServer HTTP/1.1
Host: 192.168.0.1
Upgrade: websocket
Connection: Upgrade
Sec-WebSocket-Key: dGhlIHNhbXBsZSBub25jZQ==
Origin: http://example.com
Sec-WebSocket-Protocol: rtsp.onvif.org
Sec-WebSocket-Version: 13.

TABLE 1-continued

Media Service Apparatus 110 -> Media Playback Apparatus 120

HTTP/1.1 101 Switching Protocols
Upgrade: websocket
Connection: Upgrade
Sec-WebSocket-Accept: s3pPLMBiTxaQ9kYGzzhZRbK+xOo=
Sec-WebSocket-Protocol: rtsp.onvif.org This WebSocket connection is made according to a WebSocket protocol that is part of the HTML5 standard. In particular, since the WebSocket connection continuously supports bidirectional communication, data can be continuously transmitted and received between the media service apparatus 110 and the media playback apparatus 120 without being disconnected.

Figure 4:
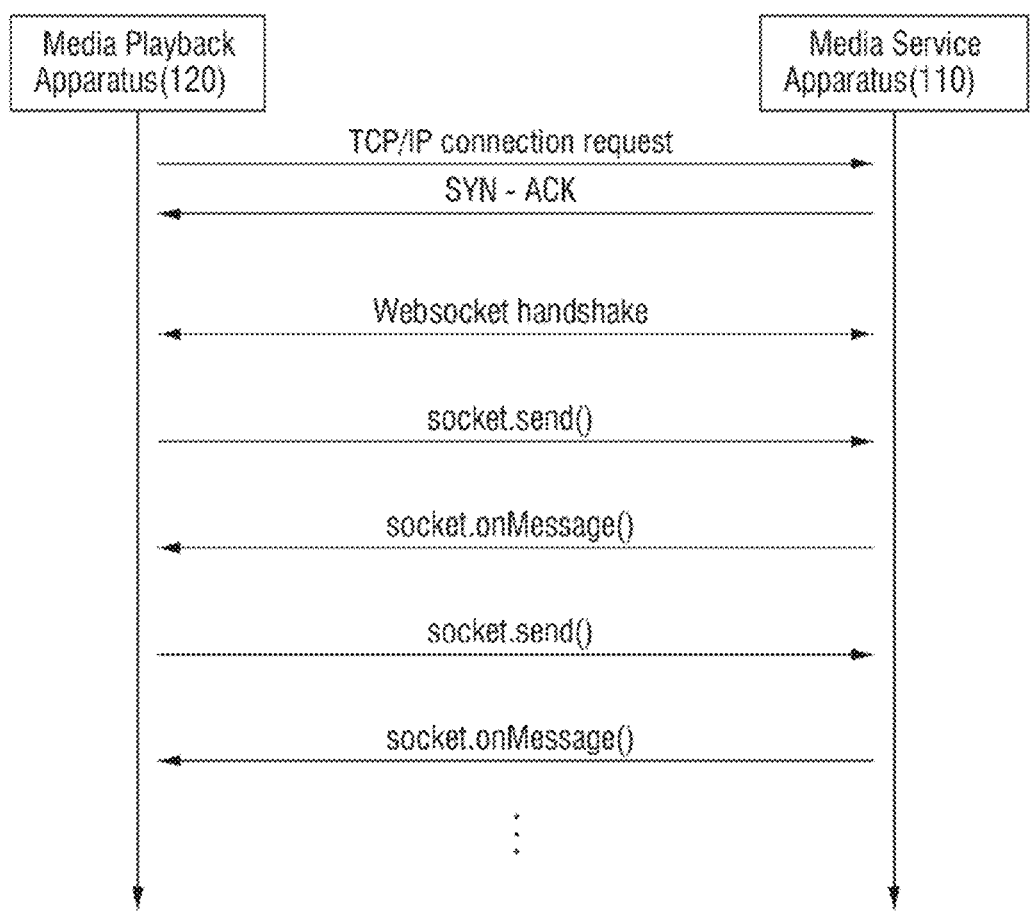
FIG. 4 shows an example of a process of transmitting and receiving data through a WebSocket connection.

FIG. 4 shows an example of a process of transmitting and receiving data through a WebSocket connection. Referring to FIG. 4, first, the media playback apparatus 120 transmits a TCP/IP connection request message to the media service apparatus 110, and the media service apparatus 110 accepts it and transmits a TCP response message (SYN-ACK) to the media playback apparatus 120, thereby establishing a TCP/IP connection. A TCP transport connection may be formed by a pair of a local TCP socket and a remote TCP socket. Each TCP socket is defined by at least an identifier such as a port number and an IP address. Of course, it is also possible to establish a User Datagram Protocol (UDP)/IP-based connection between them instead of the TCP/IP-based connection.

Then, when the WebSocket connection is established through a handshake process between the media playback apparatus 120 and the media service apparatus 110, continuous data transmission/reception between them can be performed thereafter. That is, the media playback apparatus 120 transmits a media streaming request to the media service apparatus 110 in the form of a transmission WebSocket packet (socket.send), and the media service apparatus 110 transmits a media stream to the media playback apparatus 120 in the form of a response WebSocket packet (socket.onMessage). This process can be performed continuously between them until media stream transmission is stopped or completed.

Figure 5:
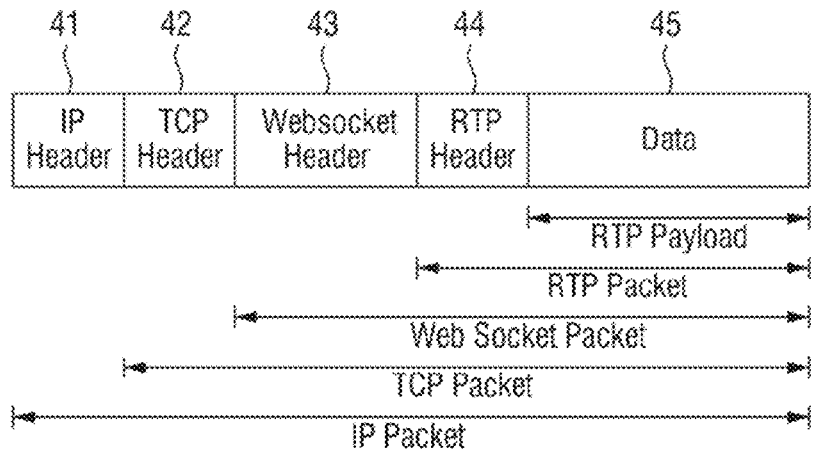
FIG. 5 is a diagram illustrating a structure of a communication packet transmitted through a network interface.

FIG. 5 is a diagram illustrating a structure of a communication packet transmitted through the network interface 21. When an RTP header 44 is added to an RTP payload corresponding to data 45, it becomes an RTP packet. The RTP packet is equal to a WebSocket payload, and a WebSocket header 43 is added to the RTP packet to become a WebSocket packet. The WebSocket packet is equal to a TCP payload, and a TCP header 42 is added to the WebSocket packet to become a TCP packet. Finally, the TCP packet is equal to an IP payload, and an IP header 41 is added to the TCP packet, thereby completing a communication packet, that is, an IP packet. The process of completing the IP packet and a process of removing each header are performed in both the media service apparatus 110 and the media playback apparatus 120.

Since the communication between the media service apparatus 110 and the media playback apparatus 120 is performed through a HTML5-based WebSocket protocol, a module responsible for RTSP/RTP transmission/reception control and a decoder can be implemented by script code that can be parsed in HTML5. Accordingly, media playback using the RTSP/RTP protocol can be implemented in a web browser of the HTML5 environment without separately installing a plug-in as in a conventional case.

The network communication scheme between the media service apparatus 110 and the media playback apparatus 120 has been described so far. Hereinafter, a configuration and operation method of the media service apparatus 110 and the media playback apparatus 120 will be described with reference to FIGS. 6 to 16.

Figure 6:
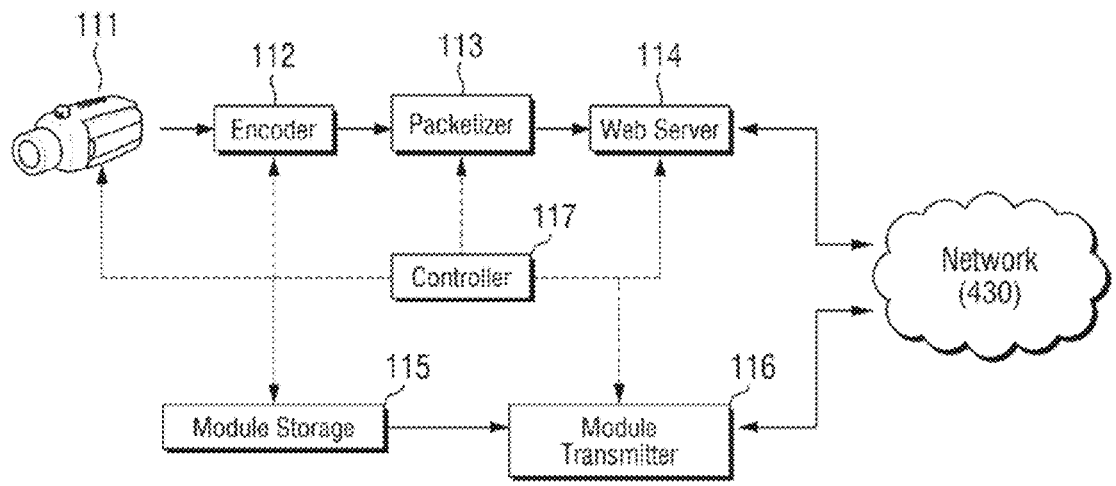
FIG. 6 shows an example embodiment of the media service apparatus.

FIG. 6 shows an example embodiment of a configuration of the media service apparatus 110. In one example embodiment, the media service apparatus 110 includes a real-time video camera 111, an encoder 112, a packetizer 113, a web server 114, a module storage 115, a module transmitter 116, and a controller 117. Various modules, components, and elements shown in FIG. 6 and other figures may be implemented with software, hardware (e.g., processor, microchip, circuitry, etc.) or a combination of both.

The real-time video camera 111 is a means for capturing media in real time, and the capturing includes a case of performing both video capturing and audio recording and a case of performing only video capturing.

The encoder 112 is configured to compress and encode the media captured by the real-time video camera 111. The encoding of the encoder 112 is not necessarily performed using a specific codec supported by a decoder embedded in the web browser, but may be performed in an arbitrary codec format.

The packetizer 113 packetizes the encoded media data to generate a transmission packet. Packetization refers to the process of dividing the media data into appropriate lengths to facilitate transmission via the network 430 or, collectively assigning control information, such as a receiving address, to each data in an appropriate length if the media data is short. In this case, the control information is located in the header of the packet. The transmission packet is in the form of the above-described WebSocket packet.

The packetizer 113 may perform packetization of the media data according to a method requested by the media playback apparatus 120. For example, when the media playback apparatus 120 requests video on a frame-by-frame basis, the packetizer 113 may generate a transmission packet in a frame format, and when the media playback apparatus 120 requests video on the basis of a container supported by a decoder embedded in a web browser, the packetizer 113 may generate a transmission packet in a container format.

The web server 114 establishes a communication session with the media playback apparatus 120. That is, a WebSocket connection is established between the web server 114 of the media service apparatus 110 and the media playback apparatus 120 through a handshake process between them. Thereafter, according to the request of the media playback apparatus 120, the transmission packet generated by the packetizer 113 is transmitted through the web server 114.

The module storage 115 is a module for storing a script module necessary to play back media in the media playback apparatus 120. The script module is a module, which allows the media playback apparatus 120 to play back media in a web browser in an HTML5 environment without installing a plug-in or a separate application program, as code written in a script that can be parsed by a web browser. The script module may be code written in JavaScript in one embodiment. The script module will be described later with reference to FIGS. 8 to 10.

The module transmitter 116 is a module for transmitting the script module stored in the module storage 115 to the media playback apparatus 120. The module transmitter 116 transmits the script module in response to a case where the media playback apparatus 120 connects to the media service apparatus 110 via the network 430.

The controller 117 is a module for controlling other configuration modules in the media service apparatus 110. For example, when the media playback apparatus 120 connects to the web server 114 through the network 430, the script module stored in the module storage 115 is transmitted to the media playback apparatus 120 through the module transmitter 116. In this case, the controller 117 sends/receives signals to/from the respective modules to control the operation to be performed smoothly.

The operation method will be described based on the description of the configuration modules of the media service apparatus 110 of FIG. 6. When the media playback apparatus 120 is connected to the web server 114 via the network 430, the module transmitter 116 transmits the script module stored in the module storage 115 to the media playback apparatus 120. When the script module is installed in the media playback apparatus 120, the user requests media playback or backup through the user interface. In response thereto, the media service apparatus 110 encodes real-time live media being captured by the real-time video camera 111 in the encoder 112 and packetizes the media data into communication packets in accordance with a frame or container format in the packetizer 113. Then, the media service apparatus 110 transmits them to the media playback apparatus 120 through the web server 114.

Figure 7:
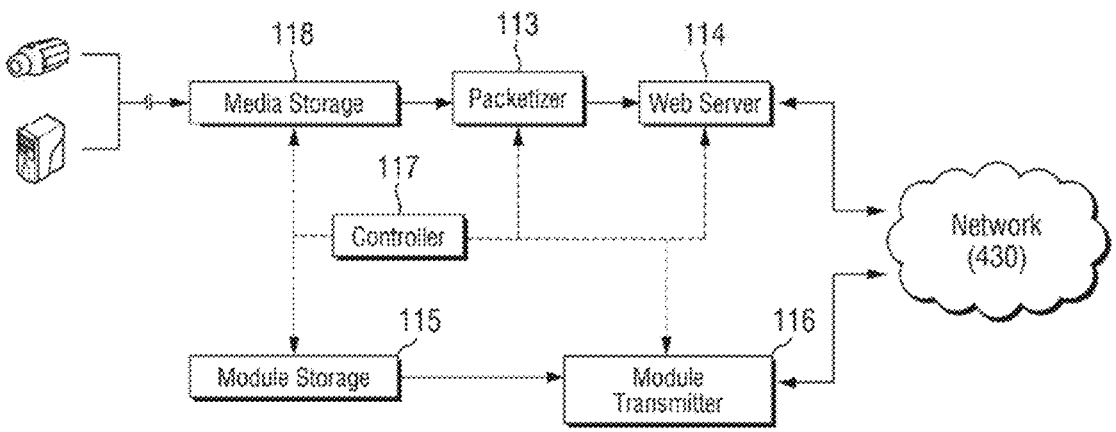
FIG. 7 shows another example embodiment of the configuration of the media service apparatus.

FIG. 7 shows another embodiment of the configuration of the media service apparatus 110. The media service apparatus 110 of FIG. 6 represents an example embodiment for transmitting real-time live media using the real-time video camera 111, and the media service apparatus 110 of FIG. 7 represents an example embodiment for transmitting media stored in a media storage 118.

The media storage 118 includes a network video recorder (NVR) or a personal video recorder (PVR). However, the example embodiment of FIG. 7 will be described in conjunction with the network video recorder.

The media storage 118 receives media data from a camera or a server and compresses and stores the received media data. When there is a request for transmission of the stored media data from the media playback apparatus 120, the media service apparatus 110 packetizes the media data stored in the media storage 118 in the packetizer 113 and transmits the packetized data through the web server 114.

In the example embodiment of FIG. 7, the packetizer 113, the web server 114, the module storage 115, the module transmitter 116 and the controller 117 among the configuration modules of the media service apparatus 110 have been described in the embodiment of FIG. 6, and thus, a redundant description thereof will be omitted.

Next, the script module stored in the module storage 115 of the media service apparatus 110 will be described in detail with reference to FIGS. 8 to 10. The script module is a module that is transmitted from the media service apparatus 110 to the media playback apparatus 120, installed in the media playback apparatus 120 and used for media playback and backup. The script module includes a process of receiving a communication packet generated by the packetizer 113 through a communication session, a process of separating compressed video data and compressed audio data included in the media data and generating a video web worker, an audio web worker and a backup web worker, a process of restoring the compressed video data and the compressed audio data, and a process of receiving video frames included in the compressed video data, receiving audio frames included in the compressed audio data and multiplexing the received video data and audio data.

The video web worker, the audio web worker and the backup web worker generated in the script module are multi-threaded web workers operating independently of each other. The script module may include a process of generating an upper main thread to interwork with the web workers through postMessages. Based on the main thread, the video web worker performs a process of restoring video data, the audio web worker performs a process of restoring audio data, and the backup web worker performs a process of multiplexing video data and audio data. Therefore, since restoration of video data, restoration of audio data, and multiplexing of video data and audio data are performed by the web workers in a multi-threaded manner, the script module can provide an environment in which the media playback apparatus 120 can perform media playback and backup simultaneously.

Hereinafter, the script module for performing the restoration of video data by the video web worker in FIG. 8, the restoration of audio data by the audio web worker in FIG. 9, and the multiplexing of video data and audio data by the backup web worker in FIG. 10 will be described. The script module may be implemented in a script that can be parsed by a web browser. In the embodiments of FIGS. 8 to 10, a case where the script module is implemented in JavaScript in will be described.

Figure 8:
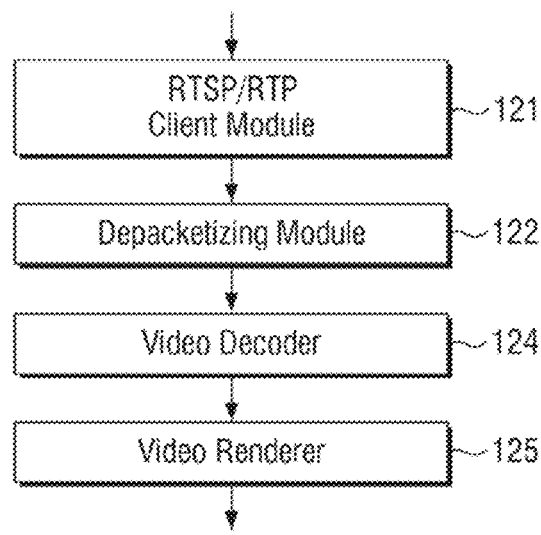
FIG. 8 shows an example embodiment of a script module.

FIG. 8 shows an example embodiment of a script module. The script module of FIG. 8 is a module for restoring video on a frame basis using a video web worker, and includes an RTSP/RTP client 121, a depacketizing module 122, a video decoder 124 and a video renderer 125.

The RTSP/RTP client module 121 is configured to support RTSP/RTP communication with the media service apparatus 110. It is possible to receive a transmission packet from the web server 114 of the media service apparatus 110 via the RTSP/RTP client module 121. At present, it is impossible to process media according to the RTSP/RTP protocol on a web browser without a plug-in. When using the RTSP/RTP client module 121, it is possible to reliably receive data transmitted through the RTSP/RTP protocol even if the web browser uses a HTTP scheme.

The depacketizing module 122 is a module for depacketizing a packet transmitted from the RTSP/RTP client module 121. Depacketization is a reverse operation of packetization. If packetization means dividing media data into pieces having appropriate lengths to form packets, depacketization means restoring the media data to a state prior to packetization by putting the pieces (i.e., packets) together again.

The decoder module 124 is a module for decompressing the encoded media data, i.e., performing decoding. The decoder module 124 is implemented in JavaScript similarly to other modules of the script module. Since the decoder module 124 is implemented in JavaScript, unlike the decoder embedded in the web browser, it is possible to perform decoding in an arbitrary codec format without limitation to the codec format. It is also possible to perform decoding on a frame-by-frame basis.

If the decoder module 124 is implemented in JavaScript according to the embodiment of FIG. 8, the decoder module 124 may be represented by the code shown in the following Table 2, for example.

TABLE 2

```
function HevcDecoder ( ) {
    var __name = "HevcDecoder";
    var self = this;
    this.__decoderParameters = null;
    this.__isRequestActive = false;
    this.__player = null;
    this.__requestContext = null;
    this.__requestContextQueue = [ ];
    this.pushRequestContext = function (requestContext) {
        self.__requestContextQueue.push(requestContext);
    };
    this.decode = function ( ) {
        if (self.__isRequestActive) {
            return;
        }
        if (self.__requestContextQueue.length) {
            self.__isRequestActive = true;
            self.__requestContext = self.__requestContextQueue.pop( );
            self.__playStream(self.__requestContext.stream);
        }
    };
    this.__createDecodeCanvas = function(parentElement) {
        self.canvas = document.createElement("canvas");
        self.canvas.style.display = "none";
        self.canvas.id = "decode-canvas";
        parentElement.appendChild(self.canvas);
        self.ctx = self.canvas.getContext("2d");
    };
    this.__playStream = function (buffer) {
        this.__reset( );
        this.__handleOnLoad(buffer);
    }
    this.__onImageDecoded = function (image) {
        var width = image.get__width( );
        var height = image.get__height( );
        this.canvas.width = width;
        this.canvas.height = height;
        this.__imageData = this.ctx.createImageData(width, height);
        image.display(this.__imageData, function (displayImageData) {
            var itemId =
    self.__requestContext.itemIds[self.__requestContext.currentFrameIndex];
            var payload = self.__requestContext.payload;
            if (height > payload.displayHeight) {
                payload.displayHeight = height;
            }
            if (!(itemId in self.__requestContext.dependencies)) {
                if (width > payload.displayWidth) {
                    payload.displayWidth = width;
                }
                payload.frames.push({
                    canvasFrameData: displayImageData.data,
                    itemId: itemId,
                    width: width,
                    height: height
                });
            }
            self.__requestContext.currentFrameIndex++;
            if (self.__requestContext.currentFrameIndex >=
    self.__requestContext.itemIds.length) {
                self.__requestContext.callback(payload);
                self.__isRequestActive = false;
                self.decode( ); // Decode next queued request
            }
        });
    };
    .
    .
    .
    this.__createDecodeCanvas(document.documentElement);
    this.__reset( );
}
```

The renderer module 125 functions to render the decoded media and display it on an output device such as a monitor or the like. The renderer module 125 converts video data in a YUV format into video data in a RGB format using WebGL. WebGL is a web-based graphical library that is available through JavaScript and allows the creation of a 3D graphical interface.

Figure 9:
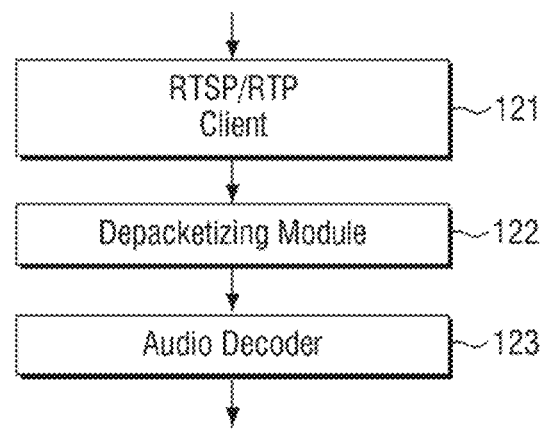
FIG. 9 shows another example embodiment of the script module.

FIG. 9 shows another example embodiment of the script module. The script module of FIG. 9 is a module for restoring audio frames using an audio web worker, and includes the RTSP/RTP client 121, the depacketizing module 122 and an audio decoder 123. The RTSP/RTP client 121 and the depacketizing module 122 are the modules described with reference to FIG. 8, and thus, a redundant description will be omitted.

The audio decoder 123 is a module for decoding and restoring the compressed audio data using the audio web worker as a thread. Similarly to the video decoder 124, the audio decoder 123 may be implemented in JavaScript, and can decode audio data without limitation on the codec format.

Figure 10:
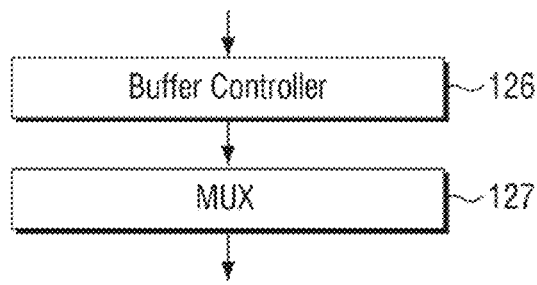
FIG. 10 shows still another example embodiment of the script module.

FIG. 10 shows still another embodiment of the script module. The script module of FIG. 10 is a module for backing up video data and audio data using a backup web worker, and includes a buffer controller 126 and a multiplexer (MUX) 127.

The buffer controller 126 receives the video frames included in the compressed video data and the audio frames included in the compressed audio data from the video web worker and the audio web worker, respectively. In this case, the received data is the data before being decoded. The buffer controller 126 may store the received video and audio frames in a buffer in any order.

The buffer controller 126 can retain the video frames and audio frames stored in the buffer even when the reception interruption of the media data occurs. If the reception of subsequent media data is resumed, video frames and audio frames obtained from the subsequent media data may be subsequently stored in the buffer.

The MUX 127 functions to multiplex the video frames and audio frames stored in the buffer in a standard storage format. In this case, the standard storage format includes an MP4 file format or an AVI file format. Further, the MUX 127 may be configured to multiplex the video frames and the audio frames stored in the buffer with a condition that all of the media data of a specified range is received through the user's save command as a trigger, generate a Blob object file, and store it in the storage of the media playback apparatus 120.

The script module described with reference to FIGS. 8 to 10 is transmitted from the media service apparatus 110 to the media playback apparatus 120 as the media playback apparatus 120 connects to the media service apparatus 110, and provides an environment in which media playback and backup can be performed in the web browser 210 of the media playback apparatus 120 without a plug-in. That is, the script module is installed in the media playback apparatus 120 to configure a system for media playback and backup. An example embodiment of the media playback apparatus 120 having the script module will be described with reference to FIGS. 11 and 12.

Figure 11:
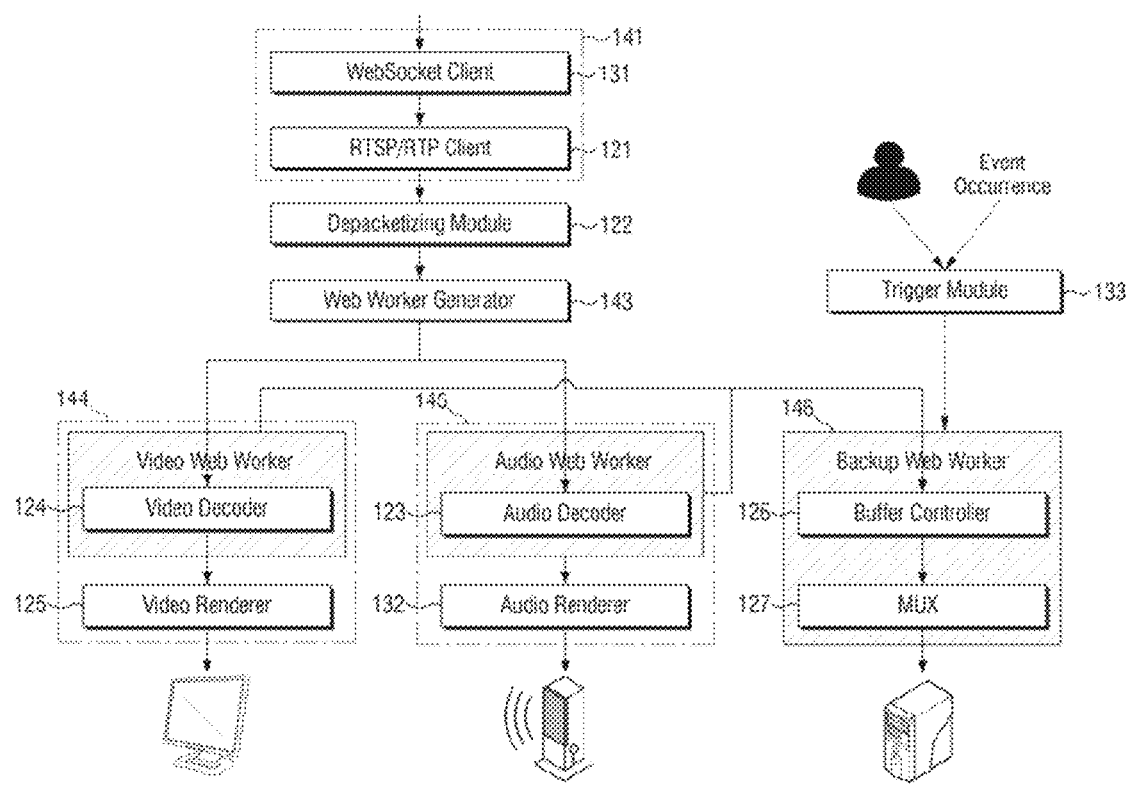
FIG. 11 shows an example embodiment of the media playback apparatus.
Figure 12:
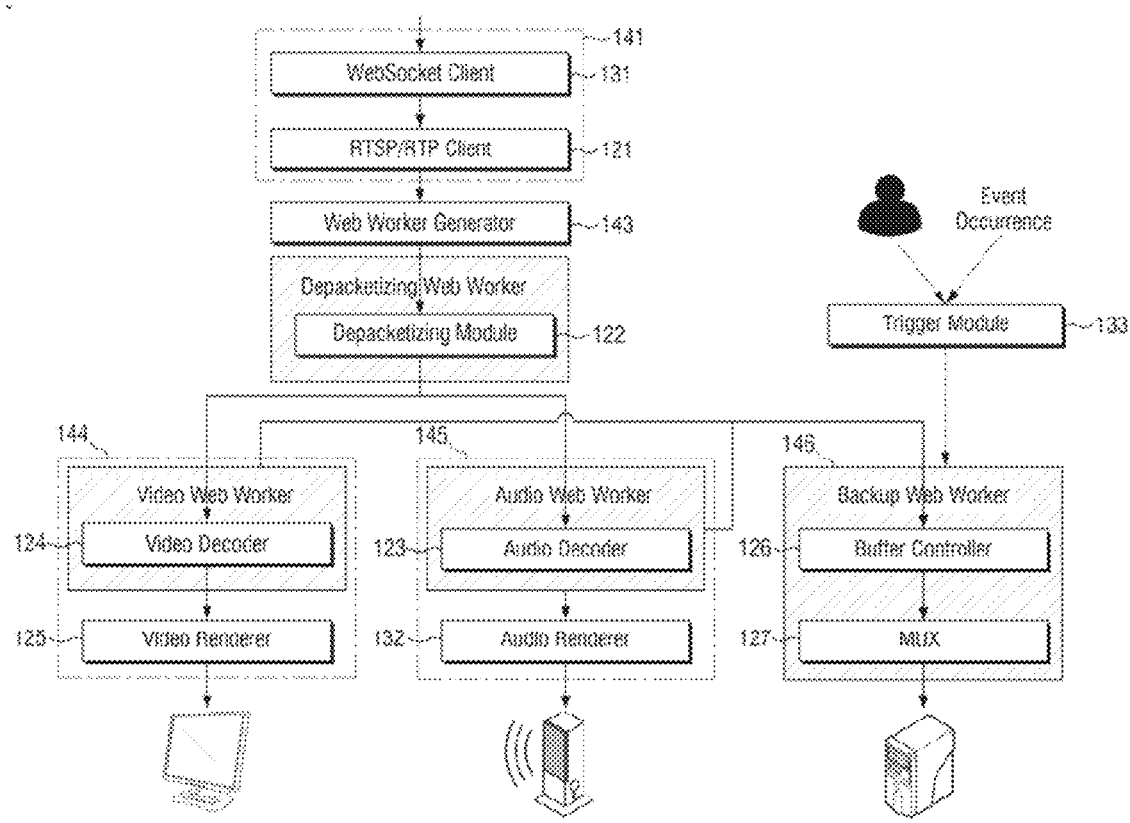
FIG. 12 shows another example embodiment of the media playback apparatus.
Figure 13:
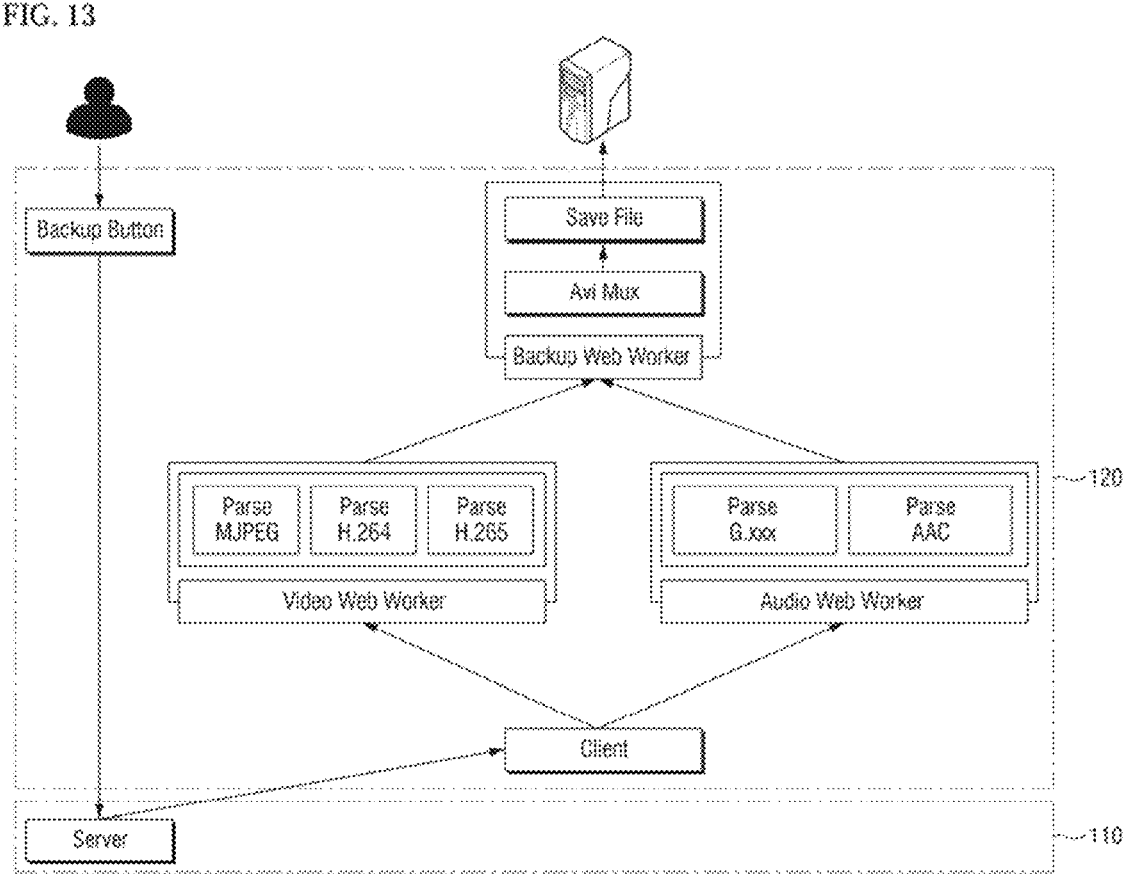
FIG. 13 shows a media backup process of the media playback apparatus.

FIGS. 11 and 12 show example embodiments of the media playback apparatus 120. The main modules for media playback in the media playback apparatus 120 are configured by a script module. Since the functions of the script module have been described with reference to FIGS. 8 to 10, the media playback apparatus 120 will be described with reference to FIGS. 11 and 12 focusing on the configuration and operation method.

FIG. 11 shows an example embodiment of the media playback apparatus 120. The media playback apparatus 120 of FIG. 11 includes a receiver 141, a web worker generator 143, a video restorer 144, an audio restorer 145, and a backup 146. The media playback apparatus 120 of FIG. 11 may be configured by receiving the script module of FIGS. 8 to 10.

The receiver 141 receives the media data generated by the media service apparatus 110 using a communication protocol which supports web services. In this case, the communication protocol supporting web services may be an RTSP/RTP protocol transmitted over a WebSocket. The receiver 141 may be configured to include a WebSocket client 131 and the RTSP/RTP client 121.

The WebSocket client 131 is a module for establishing a WebSocket connection with the web server 114 of the media service apparatus 110. The media playback apparatus 120 and the media service apparatus 110 send and receive a transmission packet through a handshake between the WebSocket client 131 and the web server 114, respectively.

The RTSP/RTP client module 121 performs a function of supporting RTSP/RTP communication in the user's web browser 210 as described in the example embodiment of FIG. 8. Accordingly, the user can play back media through the web browser 210 of the HTML5 environment using the RTSP/RTP protocol without installing a separate plug-in.

The RTSP/RTP client 121 separates the media data received from the WebSocket client 131 into video data and audio data and transmits the data to the depacketizing module 122. The depacketizing module 122 performs depacketization of video data and audio data.

Next, processes performed by the web worker generator 143 will be described with reference to FIG. 14. The web worker generator 143 may generate a main thread, a video web worker, an audio web worker and a backup web worker so that the media playback apparatus 120 can perform media playback and backup in a multi-threaded manner. The main thread may be a user interface script as an underlying thread for performing media playback and backup in the media playback apparatus 120. The video web worker, the audio web worker and the backup web worker constitute a multi-thread as lower threads of the main thread. For example, messages can be exchanged between the main thread and the web workers by using a postMessage method, in which only a single variable is allowed as the data to be transmitted.

The form of postMessage transmitted between the main thread and the web worker is shown in Table 3 below.

TABLE 3

Message transfer from the main thread to the web worker:
myWorker.postMessage(aMessage, transferList);
Message transfer from the web worker to the main thread:
postMessage(aMessage, transferList);

The video web worker is used in the video restorer 144 when the video decoder 124 decodes the compressed video and the audio web worker is used in the audio restorer 145 when the audio decoder 123 decodes the compressed audio. After the video web worker separates the compressed video data and the audio web worker separates the compressed audio data, when the compressed video and audio data are transmitted to the backup web worker, the backup web worker may multiplex the compressed video and audio data and store the multiplexed data in the storage.

Since JavaScript supports only single-thread processing, when media playback and backup are performed at the same time, they can affect each other as an interrupt. Accordingly, the web worker generator 143 generates a main thread and a video web worker, an audio web worker and a backup web worker, which are multi-threaded web workers that operate independently of each other as lower threads of the main thread, so that media playback and backup can be performed at the same time.

Referring back to FIG. 11, the video restorer 144 performs decoding and rendering of the depacketized video data, and includes the video decoder 124 and the video renderer 125.

The video decoder 124 decodes the compressed video data using the video web worker to restore video. The video decoder 124 consists of a script that can be parsed by a web browser. In this case, the script that can be parsed by a web browser may be JavaScript. Since the video decoder 124 can be implemented in JavaScript, the format that can be decoded by the video decoder 124 is not limited. That is, it is possible to decode video data of various codec formats including a video format that can be decoded by a video decoder embedded in a web browser.

The video renderer 125 renders the restored video data in a form that can be outputted from a display device such as a monitor. The video renderer 125 may convert video data in a YUV format into video data in an RGB format using WebGL.

The audio restorer 145 performs decoding and rendering of the depacketized audio data and includes the audio decoder 123 and an audio renderer 132.

The audio decoder 123 decodes the compressed audio data using the audio web worker to restore audio. The audio decoder 123 consists of a script that can be parsed by a web browser. In this case, the script that can be parsed by a web browser may be JavaScript. Since the audio decoder 123 can be implemented in JavaScript similarly to the video decoder 124, the audio format that can be decoded by the audio decoder 123 includes an audio format that can be decoded by an audio decoder embedded in a web browser.

The audio renderer 132 renders the restored audio data in a form that can be outputted from an output device such as a speaker. The audio renderer 132 may be implemented as a Web Audio API supported by a web browser.

The backup 146 performs a function of multiplexing the video data and the audio data using the backup web worker and storing the data in the storage and includes the buffer controller 126 and the MUX 127.

The backup web worker may receive a trigger signal from a trigger module 133 and initiate an operation of multiplexing and storing the video data and the audio data. In this case, the trigger module 133 may generate a trigger signal when an input of a user command or the occurrence of a specific event is detected. A specific event means an event arbitrarily designated by the user, such as appearance of an object specified in the video, generation of audio over a certain level, scene change, or the like.

When a trigger signal is received from the trigger module 133, the buffer controller 126 receives the video frames contained in the compressed video data from the video web worker and the audio frames contained in the compressed audio data from the audio web worker. In this case, the video data and the audio data have yet to be decoded. In FIG. 11, arrows are connected from the video web worker and the audio web worker to the buffer controller 126. This means that the backup web worker used as a thread in the buffer controller 126 is connected with the video web worker and the audio web worker, respectively, using pipelines to receive the outputs processed by the video web worker and the audio web worker.

The buffer controller 126 stores the received video and audio frames in the buffer in any order. Further, even when reception interruption of media data occurs, the video frames and audio frames stored in the buffer are retained so that the video frames and audio frames obtained from subsequent media data can be stored subsequently in the buffer when the reception of the subsequent media data is resumed.

The MUX 127 may multiplex the video frames and audio frames stored in the buffer in a standard storage format and store them in the storage of the media playback apparatus 120. In this case, the standard storage format includes an MP4 file format or an AVI file format. When the user issues a save command in the user interface, the MUX 127 may multiplex the video and audio frames stored in the buffer, generate a Blob object file, and store it in the storage when all the media data of a specified range is received.

The process of generating the Blob object file by the buffer controller 126 and the MUX 127 will be described in more detail with reference to FIG. 15. When the user issues a backup start command of the media through the user interface, the buffer controller 126 receives video frames 311 and audio frames 312 from the video web worker and the audio web worker, respectively, and store them in a buffer 310 (S2100).

The buffer controller 126 retains the video frames and the audio frames stored in the buffer 310 even when the user issues a command to stop the backup of the media through the user interface or the media reception is interrupted. Thereafter, when a command to resume the backup of the media is issued or the media reception is restored through the user interface, the buffer controller 126 subsequently stores subsequent video frames 311 and subsequent audio frames 312 in the buffer 310 (S2200).

When the user issues a backup end command of the media through the user interface, the MUX 127 generates a Blob object by multiplexing the video frames 311 and the audio frames 312 stored in the buffer 310 in the standard storage format from the start of the backup to the end of the backup, and stores the Blob object in the storage (S2300).

Figure 15:
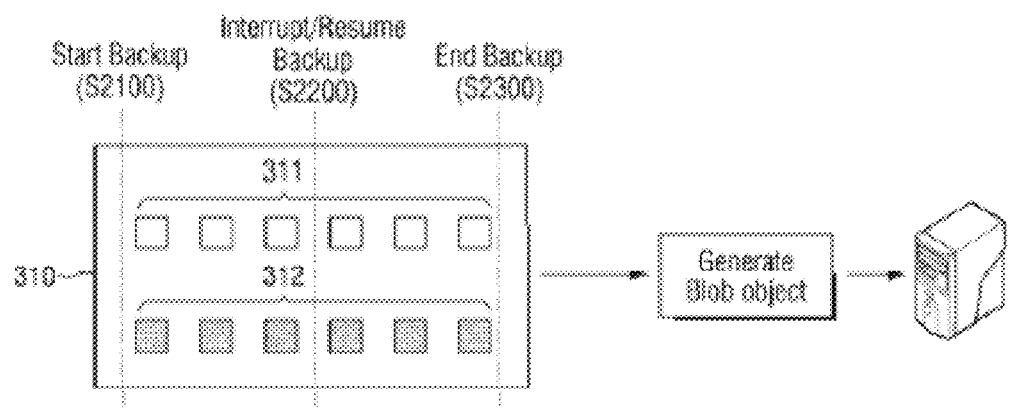
FIG. 15 shows a process of generating a Blob object file in a backup unit.

Although it is illustrated in FIG. 15 that video frames and audio frames are stored separately in order, this is merely to facilitate visual understanding, and video frames and audio frames may be stored in the buffer 310 in any order and may be allocated and stored at arbitrary addresses of the buffer 310.

FIG. 12 shows another example embodiment of the media playback apparatus 120. Compared with the media playback apparatus 120 of FIG. 11, a depacketization operation is performed by the main thread in the media playback apparatus 120 of FIG. 11, but a depacketization operation is performed by a depacketizing web worker in the media playback apparatus 120 of FIG. 12. In this case, the depacketizing web worker may be a lower thread of the main thread generated by the web worker generator 143, similarly to the video web worker, the audio web worker and the backup web worker.

In the example embodiment of FIG. 12, it is also possible to perform the depacketization operation as a separate thread through the depacketizing web worker. Accordingly, it may be possible to improve the efficiency in the depacketization process. However, when an additional depacketizing web worker is created, overhead may occur due to the use of a large number of postMessages between the main threads. That is, when the depacketization operation is performed using the depacketizing web worker, which is a separate lower thread, the trade-off relationship is generated as described above. Therefore, advantage or disadvantage may be different according to actual implementation conditions as compared with the example embodiment of FIG. 11.

The configuration of the media playback apparatus 120 has been described with reference to FIGS. 11 and 12. The media backup process of the media playback apparatus 120 will be described with reference to FIG. 13. The user may issue a backup command for the media being played through the user interface. The media data received from the media service apparatus 110 to the media playback apparatus 120 is separated into video data and audio data, which are respectively transmitted to the video restorer 144 operated by the video web worker and the audio restorer 145 operated by the audio web worker. The video web worker transmits the parsed video data, and the audio web worker transmits the parsed audio data to the backup 146, which is operated by the backup web worker. In the backup 146, the video data and the audio data are multiplexed in a standard storage format (MP4 file format or AVI file format) and stored in the storage of the media playback apparatus 120.

Figure 16:
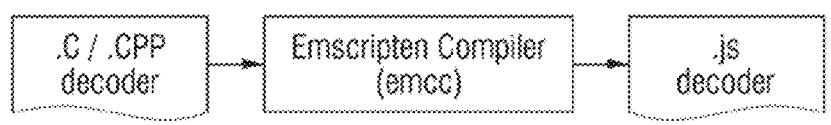
FIG. 16 is a diagram explaining a process of generating a script module implemented in JavaScript according to an example embodiment.

FIG. 16 is a diagram explaining a process of generating a script module implemented in JavaScript according to an example embodiment of the present disclosure. Referring to FIG. 16, a script module implemented in JavaScript may be implemented by converting a source written in C and C++ native code using a converter such as Emscripten to obtain JavaScript code that can be used in a browser.

When using a converter such as Emscripten, it is possible to obtain a decoder or a container implemented in JavaScript from native code. Accordingly, there is an advantage that codec dependency may be reduced.

Since JavaScript code is used instead of a plug-in, it is unnecessary to worry about a browser's support interruption. In addition, there is no need to worry about whether to use the ActiveX interface or the NPAPI interface depending on the browser. That is, there is an advantage that the dependency on the browser may be reduced.

Figure 17:
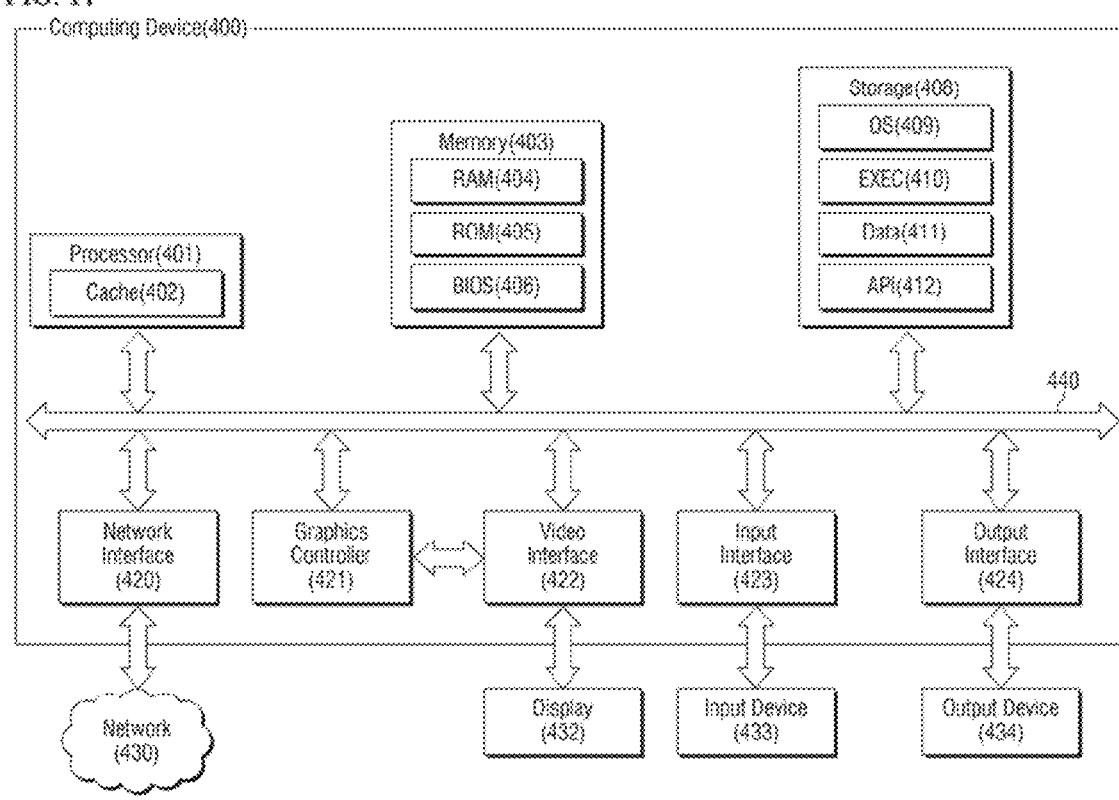
FIG. 17 is an example diagram of a computing device for implementing the media playback apparatus.

The media playback apparatus 120 shown in FIG. 1 may be implemented, for example, as a computing device 400 shown in FIG. 17. The computing device 400 may be, but is not limited to, mobile handheld devices (e.g., smart phones, tablet computers, etc.), laptop or notebook computers, distributed computer systems, computing grids or servers. The computing device 400 may include a processor 401, a memory 403 and a storage 408 that communicate with each other or with other elements via a bus 440. The bus 440 may be further connected to a display 432, at least one input device 433, and at least one output device 434. Each of the elements depicted in FIG. 17 and other drawings such as FIGS. 6 and 7 may be implemented with hardware with circuitry to perform relevant functions, software such as instructions stored in a computer-readable storage medium, or a combination of both.

All of these elements may be connected to the bus 440 directly or via one or more interfaces or adapters. The bus 440 is connected to a wide variety of subsystems. The bus 440 may include a memory bus, a memory controller, a peripheral bus, a local bus, and a combination thereof.

The processor (e.g., a central processing unit (CPU)) 401 optionally includes a cache memory 402, which is a local storage for temporarily storing instructions, data, or computer addresses. The processor 401 executes instructions (or software modules) stored in a computer-readable storage medium, such as the memory 403 or the storage 408. The computer-readable storage medium may store software modules implementing particular embodiments, and the processor 401 may execute the stored software modules.

The memory 403 may include a random access memory (RAM) 404, a read-only memory (ROM) 405, and a combination thereof. Further, a basic input/output system (BIOS) (e.g., firmware) having basic routines necessary for booting the computing device 400 may be included in the memory 403.

The storage 408 is used to store an operating system 409, executable files (EXEC) 410, data 411, API 412, and the like. The storage 408 may be a hard disk drive, an optical disk drive, a solid-state drive (SSD), and the like.

The computing device 400 may include the input device 433. The user may enter commands and/or information into the computing device 400 via the input device 433. Examples of the input device 433 may include a keyboard, a mouse, a touch pad, a joystick, a game controller, a microphone, an optical scanner, and a camera. The input device 433 may be connected to the bus 440 via an input interface 423 including a serial port, a parallel port, a game port, a Universal Serial Bus (USB), and the like.

In some embodiments, the computing device 400 is connected to the network 430. The computing device 400 is connected to other devices via the network 430. In this case, the network interface 420 receives communication data in the form of one or more packets from the network 430, and the computing device 400 stores the received communication data for the processing of the processor 401. Similarly, the computing device 400 stores the transmitted communication data in the form of one or more packets in the memory 403, and the network interface 420 transmits the communication data to the network 430.

The network interface 420 may include a network interface card, a modem and the like. Examples of the network 430 may include the Internet, a wide area network (WAN), a local area network (LAN), a telephone network, a direct connection communication and the like, and a wired and/or wireless communication scheme may be employed.

The execution result of the software module by the processor 401 may be displayed through the display 432. Examples of the display 432 may include a liquid crystal display (LCD), an organic light-emitting display (OLED), a cathode ray tube (CRT), and a plasma display panel (PDP). The display 432 is connected to the bus 440 via a video interface 422 and the data transfer between the display 432 and the bus 440 can be controlled by a graphics controller 421.

In addition to the display 432, the computing device 400 may include at least one output device 434, such as an audio speaker and a printer. The output device 434 is coupled to the bus 440 via an output interface 424. The output interface 424 may be, for example, a serial port, a parallel port, a game port, a USB, or the like.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Therefore, it should be understood that the above exemplary embodiments are only exemplary, but are not limited. The scope of the present disclosure is represented by the scope of the accompanying claims, rather than the detailed description. All changes or modifications derived from the meaning and scope of the claims and equivalent concepts thereof should be interpreted as being included in the scope of the present disclosure.

What is claimed is:

1. A media playback apparatus for playing back and backing up media on a web browser, the media playback apparatus comprising at least one hardware processor to implement:

a receiver configured to receive media data generated in a media service apparatus using a communication protocol which supports web services, and separate compressed video data and compressed audio data from the media data;

a web worker generator configured to generate a plurality of web workers including a video web worker, an audio web worker and a backup web worker;

a video decoder, further implemented as a first script supported by the web browser, and configured to decode the compressed video data using the video web worker as a first thread to restore video;

an audio decoder, further implemented as a second script supported by the web browser, and configured to decode the compressed audio data using the audio web worker as a second thread to restore audio; and a backup configured to:

in response to a backup start command received via a user interface, receive video frames, included in the compressed video data that has not yet been decoded, from the video web worker, receive audio frames, included in the compressed audio data that has not yet been decoded, from the audio web worker, and simultaneously with playing back of the video frames and the audio frames, perform, using the backup web worker as a third thread, storing in a buffer the video frames and the audio frames included in the compressed video data and the compressed audio data that have not yet been decoded; and in response to a save command received via the user interface, multiplex the video frames and the audio frames stored in the buffer and store the multiplexed video frames and audio frames in a storage.

2. The media playback apparatus of claim 1, further comprising a trigger module implemented by the at least one hardware processor, the trigger module configured to generate a trigger signal when an input of the save command or an occurrence of a specific event is detected and provide the generated trigger signal to the backup, wherein the backup starts multiplexing and storing operations according to the trigger signal.

3. The media playback apparatus of claim 1, wherein the backup web worker is connected using pipelines with the video web worker and the audio web worker to receive outputs processed by the video web worker and the audio web worker, respectively.

4. The media playback apparatus of claim 1, wherein the plurality of web workers further include a depacketizing web worker, and the media playback apparatus further comprises a depacketizing module, implemented by the at least one hardware processor, configured to perform depacketization of the separated video data and audio data using the depacketizing web worker as a fourth thread.

5. The media playback apparatus of claim 1, wherein at least one of the first script and the second script can be parsed by the web browser and is JavaScript.

6. The media playback apparatus of claim 1, further comprising:

a video renderer, implemented by the at least one hardware processor, configured to render the restored video in a form that can be outputted from a display device; and an audio renderer, implemented by the at least one hardware processor, configured to render the restored audio in a form that can be outputted from a speaker.

7. The media playback apparatus of claim 6, wherein the video renderer renders the restored video using WebGL, and the audio renderer renders the restored audio using an application programming interface (API) supported by the web browser.

8. The media playback apparatus of claim 1, wherein the web worker generator generates an upper main thread to interwork with the video web worker, the audio web worker and the backup web worker through postMessages.

9. The media playback apparatus of claim 1, wherein the video web worker, the audio web worker and the backup web worker are multi-threaded web workers which operate independently of each other.

10. The media playback apparatus of claim 1, wherein a media format that can be decoded in the video decoder and the audio decoder includes a media format that can be decoded in a video decoder and an audio decoder embedded in the web browser.

11. A media playback apparatus for playing back and backing up media on a web browser, the media playback apparatus comprising at least one hardware processor:

a receiver configured to receive media data generated in a media service apparatus using a communication protocol which supports web services, and separate compressed video data and compressed audio data from the media data;

a web worker generator configured to generate a plurality of web workers including a video web worker, an audio web worker and a backup web worker;

a video decoder, further implemented as a first script supported by the web browser, and configured to decode the compressed video data using the video web worker as a first thread to restore video;

an audio decoder, further implemented as a second script supported by the web browser, and configured to decode the compressed audio data using the audio web worker as a second thread to restore audio; and a backup configured to:

in response to a backup start command received via a user interface, receive video frames, included in the compressed video data that has not yet been decoded, from the video web worker, receive audio frames, included in the compressed audio data that has not yet been decoded, from the audio web worker, and simultaneously with playing back of the video frames and the audio frames, perform, using the backup web worker as a third thread, storing in a buffer the video frames and the audio frames included in the compressed video data and the compressed audio data that have not yet been decoded; and in response to a save command received via the user interface, multiplex the video frames and the audio frames stored in the buffer and store the multiplexed video frames and audio frames in a storage, wherein the backup stores the video frames and the audio frames in the buffer in any order, and multiplexes the video frames and the audio frames stored in the buffer in a standard storage format through the backup web worker.

12. The media playback apparatus of claim 11, wherein the standard storage format includes an MP4 file format or an AVI file format.

13. The media playback apparatus of claim 11, wherein when all of the media data in a range specified by a user through the save command is received, the backup multiplexes the video frames and the audio frames stored in the buffer, generates a Blob object file and stores the generated Blob object file in the storage.

14. The media playback apparatus of claim 11, wherein the backup retains the video frames and the audio frames stored in the buffer even when reception interruption of the media data occurs, and when reception of subsequent media data is resumed, subsequently stores video frames and audio frames obtained from the subsequent media data in the buffer.

15. A media service apparatus for transmitting media data to a media playback apparatus, the media service apparatus comprising at least one hardware processor to implement:
   a module storage configured to store a script module necessary to play back the media data on a web browser of the media playback apparatus;
   a module transmitter configured to transmit the script module to the media playback apparatus in response to connection of the media playback apparatus;
   a packetizer configured to packetize the media data to generate a communication packet; and
   a web server configured to establish a communication session with the media playback apparatus and transmit the communication packet to the media playback apparatus in response to a request from the media playback apparatus,
   wherein the script module is configured to:
      receive the communication packet through the communication session,
      separate compressed video data and compressed audio data from the media data,
      generate a video web worker, an audio web worker and a backup web worker,
      in response to a backup start command received via a user interface, receive video frames, included in the compressed video data that has not yet been decoded, from the video web worker, receive audio frames, included in the compressed audio data that has not yet been decoded, from the audio web worker, and simultaneously with playing back of the video frames and the audio frames, perform, using the backup web worker as a third thread, storing in a buffer the video frames and the audio frames included in the compressed video data and the compressed audio data that have not yet been decoded; and
      in response to a save command received via the user interface, multiplex the video frames and the audio frames stored in the buffer and store the multiplexed video frames and audio frames in a storage.

16. The media service apparatus of claim 15, wherein the script module is implemented as a script supported by the web browser, and
   wherein the script module is further configured to decode the compressed video data using the video web worker as a thread to restore video, and decode the compressed audio data using the audio web worker as a thread to restore audio.

17. The media service apparatus of claim 16, wherein the storing in the buffer comprises storing the video frames and the audio frames in the buffer in any order, and multiplexing comprises multiplexing the video frames and the audio frames stored in the buffer in a standard storage format through the backup web worker.

18. The media service apparatus of claim 17, wherein the script module is further configured to generate a trigger signal when an input of the save command or an occurrence of a specific event is detected and starting the multiplexing and storing operations according to the trigger signal.

19. The media service apparatus of claim 17, wherein multiplexing the video frames and the audio frames comprises generating a Blob object file and storing the generated Blob object file in the storage of the media playback apparatus when all of the media data in a range specified by a user through the save command is received.

20. The media service apparatus of claim 17, wherein multiplexing the video frames and the audio frames comprises retaining the video frames and the audio frames stored in the buffer even when reception interruption of the media data occurs, and when reception of subsequent media data is resumed, subsequently storing video frames and audio frames obtained from the subsequent media data in the buffer.

* * * * *